FOOD PATTY PRESS

Original Filed May 1, 1969

United States Patent Office

Re. 28,106
Reissued Aug. 6, 1974

28,106
FOOD PATTY PRESS

Richard D. Lee, St. Paul, Minn., assignor to Le Mark Industries, Inc., St. Paul, Minn.

Original No. 3,609,799, dated Oct. 5, 1971, Ser. No. 820,978, May 1, 1969. Application for reissue June 7, 1973, Ser. No. 368,208
Int. Cl. A22c *7/00*
U.S. Cl. 17—32 10 Claims

Matter enclosed in heavy brackets [ ] appears in the original patent but forms no part of this reissue specification; matter printed in italics indicates the additions made by reissue.

ABSTRACT OF THE DISCLOSURE

The body of a press for hamburger or the like is provided with a vertical cylindrical opening extending through it. A bottom closure plate completely closes the lower end of the cylindrical opening. Relatively thin nylon discs are dropped into the press alternately with measured portions of hamburgers to be pressed, and a nylon plunger is forced down upon the top of each meat portion as it is put into the press to form a layer of meat patties separated by the nylon discs. A cover is provided to enclose the top of the cylindrical opening, either when the plunger is stored in the body or when meat patties are therein.

Hollow walls of the body of the press encompass a freezable liquid so that the patties can be stored at a safe temperature inside of the press for extended periods.

The patties are removed from the press by removing the cover, inserting the end of the plunger against the surface of the uppermost patty, removing the body from the bottom plate, inverting the body, placing the outer end of the plunger in contact with a horizontal surface, and forcing the body down toward that surface thus to expose any and all of the patties so they can be removed from the press one at a time or all together. The length of the plunger is such that when the entire press body is resting in inverted position on the horizontal surface, with the handle of the piston rod in touch with that surface, the last patty will be resting on the piston in position where it can be easily removed from the press.

BACKGROUND OF THE INVENTION

This invention has relation to apparatus for molding previously measured portions of meat such as hamburger, salmon, meat loaf, or other food products into patty form through the use of pressure.

Previously, moldable foods such as ground meat or hamburger have been forced into elongated molds before being divided into measured portions, and attempts have been made to slice or otherwise separate the homogeneous mass of meat in the mold by slicing into the mold with a knife or a separator. This system has the disadvantage of requiring slots in the mold which tend to allow the hamburger to press out from the mold when it is being formed into a cylinder-like glob, thus making it difficult or impossible to slide separators through the slots. Food particles adhere to these slots and the device is very difficult or impossible to completely clean after it has been used.

Attempts have been made to slide such a cylindrical mass of meat out of the end of a press and to cut off the patties one at a time as the meat is extruded from the press. This results in at least some deformation of the meat even under ideal conditions, and in many cases the patty form desired is substantially entirely lost in the slicing process. Further, there is no convenient may to insure that all patties are of the same size as the measurement is by eye and may or may not result in the same weight of material going into each patty. Such a deviation in patty size, shape or weight will result in different cooking characteristics.

A further problem with trying to push the entire homogeneous cylindrical mass from a press resides in the tendency of the meat to adhere to the sides of the press.

One form of hamburger press presently used consists of a base in which a well is provided, and a cover hinged to the base, the cover having a downwardly extending boss in alignment with the well on the base. In order to try to keep the formed hamburgers from adhering to the well and the boss, it is necessary to lay a piece of wax paper over the boss, place the measured amount of meat on top of the wax paper, and to place another piece of wax paper over the top of the meat. The boss is pressed down into the well squashing the meat between the paper layers. The wax paper and hamburger are then forced down into the shape of the well by the boss. The resulting "sandwich" of wax paper, hamburger and wax paper is then stored with other such "sandwiches" for usage. Inevitably the hamburgers are adhered to the wax paper so tightly that getting them off so that they can be used results in as much mess to the cook as if she had formed the patty in her own hands in the first place.

SUMMARY OF THE INVENTION

A four part patty press of the present invention includes a body having a substantially vertical passageway extending through it; a bottom closure plate of shape to fit into and completely close the lower end of said body; a cover of shape to close the upper end of said passageway; and a plunger including a piston very slightly smaller than a transverse section of the passageway. A plurality of thin patty separators of material which will not adhere to the food to be pressed are provided and are of identically the same shape and dimension as a transverse section of the vertical passageway.

With the body of the food press positioned over the bottom closure plate thereof and with one of the separators lying in the passageway and on top of the bottom plate, a measured portion of hamburger or other food to be pressed is dropped into the vertical passageway, and the plunger is forced down on to it to form the first patty. The plunger face is preferably slightly conical with the apex of the cone being in the center of the piston face and the sides diverging upwardly and outwardly therefrom. It is made of a material which will not adhere to the meat. The plunger can be rocked slightly as it is forced down and this and the shape of the piston face causes the hamburger to be forced tightly out against the sides of the vertical passageway thus causing a perfect patty to be formed every time.

The plunger will then be removed, and the second separator followed by the second measured portion of meat will be inserted into the passageway, where the plunger will again be utilized to form the patty. This process is repeated until the desired number of patties has been formed. The press, as shown, has hollow walls which encompass a freezable liquid. If the patties are to be stored within the press for any considerable time and the press is to be stored outside of a refrigerator, this liquid will have been frozen prior to the formation of the patties as above described.

When the patties are to be removed from the press, the body of the press is lifted from the bottom closure plate, the plunger inserted on top of the top patty, the body and plunger inverted and the plunger set against a horizontal surface. The body will be forced down toward that surface causing the piston face to carry the patties, one at a time, into clearing relationship with the body. Because each of the separators is scraping against the edge of the cylindrical passageway when this happens, the meat tends not to adhere to the cylinder walls. Because the piston face is supporting virtually the entire surface of the last patty to be formed and, consequently all of the others, deformation of the sape of the patties is completely avoided.

The relationship of the length of the plunger's piston rod to the body is such that the last patty will be in position to be easily removed from the piston face when the body of the press and the handle of the piston rod are resting against the horizontal surface.

The relationship between the cover, the body, the plunger and the bottom closure plate are such that the plunger can be stored inside the body with its piston face in contact with the bottom closure and with the cover in place.

DESCRIPTION OF THE PREFERRED EMBODIMENT

Figure 1:
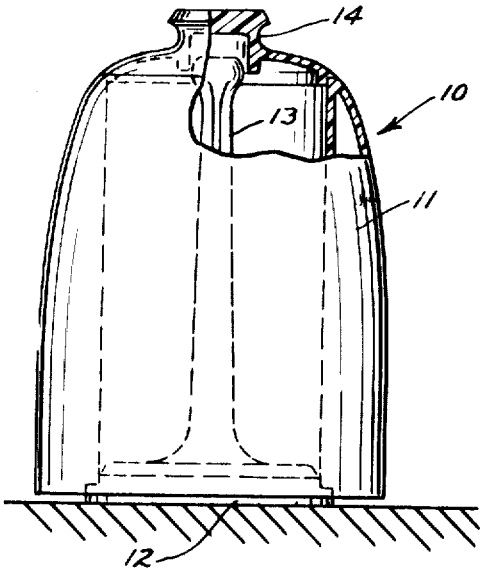
FIG. 1 is an elevational view of the patty press of the present invention with parts broken away to show the relationship of the plunger, the cover, the bottom closure and the body when the press is stored.

Patty press 10 includes a body 11, a bottom closure member or plate 12, a plunger 13, and a cover 14.

Figure 2:
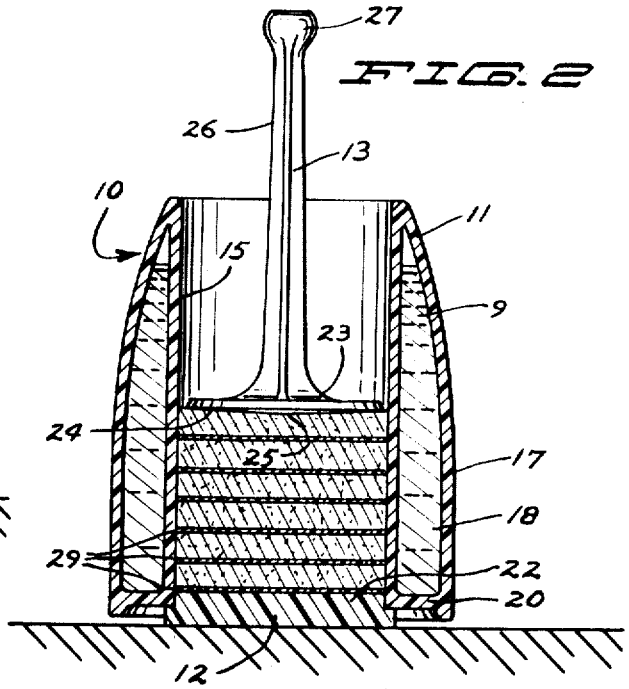
FIG. 2 is a vertical sectional view of the patty press of FIG. 1 showing the relationship of the parts after a number of patties have been formed.
Figure 3:
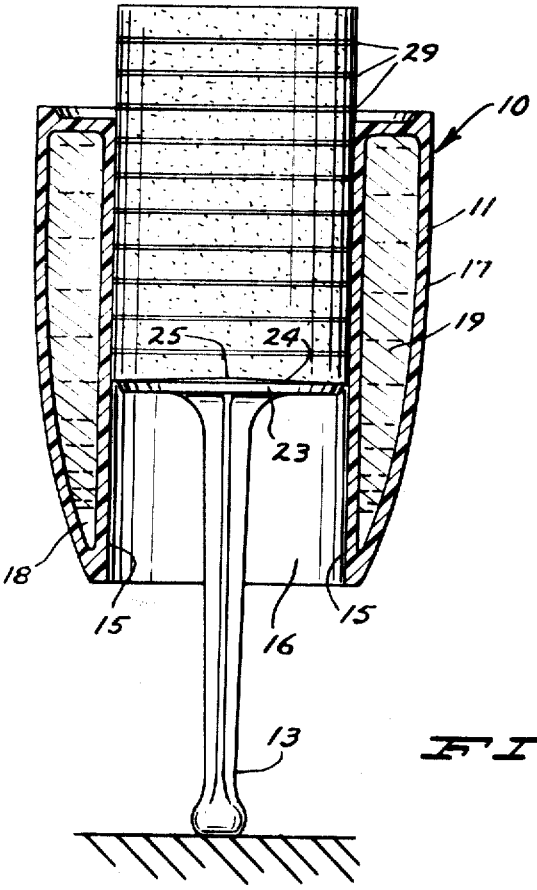
FIG. 3 is a vertical sectional view showing a plurality of patties being expelled from the press.

The body 11 includes an inner cylinder wall 15 defining a vertical cylindrical passageway 16, an outer upright wall 17 spaced from the inner wall and a floor 20 joining these walls to provide a sealed coolant compartment 18. This compartment can be filled with a two phase fluid 19, such as water, which can be pre-frozen to preserve patties stored in the press at a safe temperature for an extended period of time. In FIGS. 2 and 3, this fluid 19 is shown in the frozen form, while in FIG. 4 it is shown after it has become melted.

The body 11 can be made out of any suitable material, but use of a material such as nylon or Teflon on the surface of the inner wall 15 to overcome any tendency of the food patty to stick to the side walls will be helpful.

The bottom closure plate 12 includes an upwardly extending boss 22 which is cylindrical in shape and exactly fills and closes the lower end of the passageway 16. As shown in FIG. 2, when the body 11 is positioned on the closure plate 12, the lower edge wall of the body is supported on an outwardly extending base integral with said boss in spaced relationship to the surface on which the closure plate is supported. This insures that there is a good sealing relationship maintained between the closure plate and the inner wall 15 of the body during the formation of patties. As clearly seen in FIG. 2, this boss base terminates in a plane perpendicular to the inner wall 15.

The plunger 13 includes a piston 23 of nylon, Teflon, wood, or other suitable material. This piston is provided with a conical piston face 24 having an apex 25 and which extends gently outwardly and upwardly from that apex as seen in FIG. 2. A piston rod 26 extends from the piston 23 to a handle 27. This handle has a flat portion 28 at the outermost surface thereof.

A plurality of round thin separator discs 29 are of exactly the same diameter as that of the vertical cylindrical passageway 16 of the body 11, and are constituted of a material which will not tend to adhere to the food material to be pressed into patties. Discs of nylon material have been found excellent for this purpose as they are stiff, flexible and resilient and as such are easily removed from the completed patties.

With the body 11 and bottom closure member 12 positioned as seen in FIG. 2, a first disc-like separator 29 is inserted into the vertical passageway 16 where it will be in intimate contact with the inner wall 15 throughout the periphery thereof thus to prevent meat particles from being extruded down along the edge of that wall. A previously measured quantity of ground meat or the like will be dropped into the vertical passageway. This meat can be measured by volume or by weight, but with the use of spoons or scoops or the like, and without the necessity of the meat having to touch human hands. Next the plunger 13 is inserted through the vertical passageway and forced down upon the meat, causing the meat to flatten and to move out toward the wall 15 in all directions. In order to insure that the meat moves out uniformly, it is possible to rock the piston as it is forced down by moving the handle 27 transversely of the longitudinal axis of the press body. This is possible because of the clearing relationship of the piston 23 with respect to the side wall 15. For purposes of clarity, that spacing has been somewhat over emphasized in the drawings and particularly in FIG. 2 thereof. Sufficient clearance to allow a slight rocking action is all that is needed. The movement of the meat uniformly outwardly in all directions is also facilitated by the slight conical shape to the piston face 24.

After the first patty is formed, the plunger can be removed either by direct vertical movement, or by an added twisting action to help the piston face 24 come clear of the meat patty. A second round, thin separator disc 29 is placed on top of the first patty, and a second measured quantity of meat is placed on top of that. The separator discs will have sufficient stiffness so that as soon as the plunger is forced down on the second quantity of meat, the second separator will act as a piston face itself and will tend to flatten out the slightly conically concave upper surface of the first patty. Specifically, the stiffness will prevent the conical shape of piston face 24 from affecting the shape of the bottom surface of the second patty.

The process of patty formation will be continued until as many patties as are needed are stored within the body of the press.

When the time comes for removing a patty from the press, the plunger and press body are positioned as seen in FIG. 3, and the press is forced downwardly toward the surface on which the plunger is resting thus to cause the patties to be extruded as seen in that figure.

Figure 4:
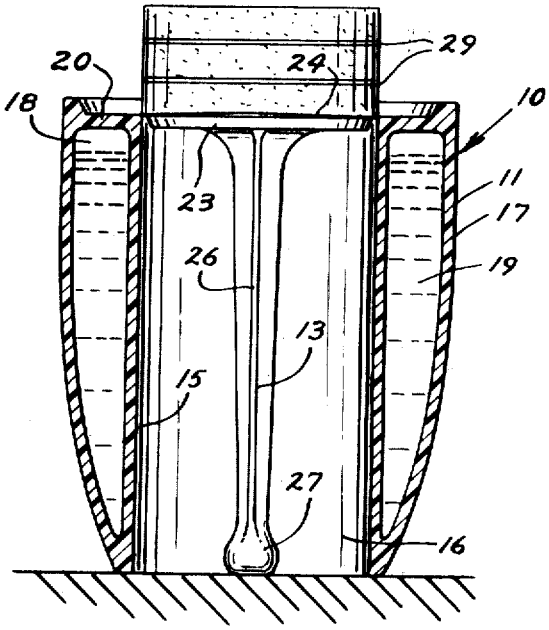
FIG. 4 is a vertical sectional view showing the relationship of parts after all of the patties have been expressed from the press and the body and plunger of the press are supported in free standing relationship on a horizontal work surface in supporting relationship to the patties which are all available for easy access.

When the patties are to be stored indefinitely for future use, for example to be frozen, the body of the press will be forced down to the position as seen in FIG. 4, and all of the patties will be resting on the piston 23 and in clearing relationship to the floor wall 20 of the body of the press.

When all of the patties are going to be used in the relatively near future, for example when they are being put on to a grill for cooking as rapidly as possible, they can also be completely extruded and the parts will then be positioned as seen in FIG. 4.

However, as is the case in connection with serving large parties, for example, it may be that the cook wants to get, and if possible, to keep a few patties ahead. In that situation the maximum number of patties which fit inside of the press can be made up ahead of time, and can be used from the press one or several at a time by the process as illustrated best in FIG. 3. When the grill is full, or when there is a temporary lack of demand for more hamburgers, the last extruded patty can be removed, the body of the press lifted vertically upwardly to bring the plunger in clearing relation with the horizontal surface, the bottom closure member 12 pushed back into place, the press body inverted to position as seen in FIG. 2, and more hamburger patties be made. As additional patties are needed, the press body can be inverted, the desired number extruded, and then the press can once again be turned as seen in FIG. 2 and additional patties formed.

The embodiments of the invention in which an exclusive property or privilege is claimed are defined as follows:

1. A food press including an upright body having a substantially vertical, continuous inner wall providing a passageway of uniform cross sectional dimension extending therethrough; a closure member movable from a first position in closing, force resistant relationship with respect to a first end of said passageway to a second position in clearing relationship thereto, said closure member being constituted as an upwardly extending boss extending into and completely filling a transverse section of said first end of said passageway and terminating in a plane perpendicular to said inner wall, and an outwardly extending base integral with the boss and terminating in an upper surface adjacent said boss in a body supporting plane also perpendicular to the inner wall and in a lower surface parallel to the plane of said boss and said upper base surface; a plunger having a piston of shape and size to fill a transverse section of said passageway; and a plurality of disc-like separators of dimension to fit into said passageway, to lie transversely thereof, and to lie in intimate contact with the entire inner wall defining said passageway; said piston plunger being of dimension to terminate in slightly spaced relation to the entire periphery of said passage wall when in said passageway, and said plunger piston being provided with a convex face; said plunger also including a piston rod extending from said piston and a handle on the other end of said piston rod; the length of said plunger being such that said piston rod face is positioned to hold all food patties clear of said press body when said body with plunger therein is inverted and rests together with the handle of said plunger on a horizontal surface.

2. A food press including an upright body having a substantially vertical, continuous inner wall providing a passageway of uniform cross sectional dimension extending therethrough; a closure member movable from a first position in closing, force resistant relationship with respect to a first end of said passageway to a second position in clearing relationship thereto, said closure member being constituted as an upwardly extending boss extending into and completely filling a transverse section of said first end of said passageway and terminating in a plane perpendicular to said inner wall, and an outwardly extending base integral with the boss and terminating in an upper surface adjacent said boss in a body supporting plane also perpendicular to the inner wall and in a lower surface parallel to the plane of said boss and said upper base surface; a plunger having a piston of shape and size to fill a transverse section of said passageway; and a plurality of disc-like separators of dimension to fit into said passageway, to lie transversely thereof, and to lie in intimate contact with the entire inner wall defining said passageway; said piston plunger being of dimension to terminate in slightly spaced relation to the entire periphery of said passage wall when in said passageway, and said plunger piston being provided with a convex face defined by a relatively flat conical section; said plunger also including a piston rod extending from said piston and a handle on the other end of said piston rod; the length of said plunger being such that said piston rod face is positioned to hold all food patties clear of said press body when said body with plunger therein is inverted and rests together with the handle of said plunger on a horizontal surface.

3. A food press including an upright body having a substantially vertical, continuous inner wall providing a passageway of uniform cross sectional dimension extending therethrough; a closure member movable from a first position in closing, force resistant relationship with respect to a first end of said passageway to a second position in clearing relationship thereto, said closure member being constituted as an upwardly extending boss extending into and completely filling a transverse section of said first end of said passageway and terminating in a plane perpendicular to said inner wall, and an outwardly extending base integral with the boss and terminating in an upper surface adjacent said boss in a body supporting plane also perpendicular to the inner wall and in a lower surface parallel to the plane of said boss and said upper base surface; a plunger having a piston of shape and size to fill a transverse section of said passageway; a plurality of disc-like a separators of dimension to fit into said passageway, to lie transversely thereof, and to lie in intimate contact with the entire inner wall defining said passageway; said piston plunger being of dimension to terminate in slightly spaced relation to the entire periphery of said passage wall when in said passageway, and said plunger piston being provided with a convex face; said plunger also including a piston rod extending from said piston and a handle on the other end of said piston rod; the length of said plunger being such that said piston rod face is positioned to hold all food patties clear of said press body when said body with plunger therein is inverted and rests together with the handle of said plunger on a horizontal surface; and a cover of configuration to close a second end of said passageway; the relationship of said cover, body, closure member and plunger being such that said plunger fits into the space defined by said cover, said inner body walls and said closure member when said cover and closure member are in place on said body.

4. The combination as specified in claim 2 wherein said inner walls, piston face and separators are of materials which will tend not to adhere to food which has been pressed.

5. The combination as specified in claim 4 wherein said material is nylon.

6. The combination as specified in claim 4 wherein said material is Teflon.

7. The combination as specified in claim 4 wherein said separators are sufficiently stiff so that the conical shape of the piston face is not transmitted to the side of a patty opposite the piston face and in contact with a separator.

8. The combinaion as specified in claim 2 wherein the separators are made of plastic material which is both flexible and resilient.

*9. A food press including an upright body having a substantially vertical, continuous inner wall providing a passageway of uniform cross sectional dimension extending therethrough; a closure member movable from a first position in closing, force resistant relationship with respect to a first end of said passageway to a second position in clearing relationship thereto, said closure member being constituted as an upwardly extending boss extending into and completely filling a transverse section of said first end of said passageway and terminating in a plane generally perpendicular to said inner wall, and an outwardly extending base integral with the boss and terminating in an upper surface adjacent said boss in a body supporting plane also perpendicular to the inner wall and in a lower surface parallel to the plane of said boss and said upper base surface; a plunger having a piston of shape and size to fill a transverse section of said passageway; and a plurality of disc-like separators of dimension to fit into said passageway, to lie transversely thereof, and to lie in intimate contact with the entire inner wall defining said passageway; said plunger also including a piston rod extending from said piston and a handle on the other end of said piston rod; the length of said plunger being such that said piston rod face is positioned to hold all of the food patties at least partially clear of said press body when said body with plunger therein is inverted and rests together with the handle of the plunger on a horizontal surface.*

*10. The combination as specified in claim 9 and a cover of configuration to close a second end of said passageway; the relationship of said cover, body, closure member and plunger being such that said plunger fits into the space defined by said cover, said inner body walls and*

*said closure member when said cover and closure member are in place on said body.*

References Cited

The following references, cited by the Examiner, are of record in the patented file of this patent or the original patent.

UNITED STATES PATENTS

| | | | |
|---|---|---|---|
| 1,968,384 | 7/1934 | Gaunt | 17—32 |
| 2,058,662 | 10/1936 | Broeg | 249—126 X |

| | | | |
|---|---|---|---|
| 2,099,638 | 11/1937 | Wiley | 17—32 |
| 2,101,755 | 12/1937 | Rosenstone et al. | 17—32 |
| 2,807,221 | 9/1957 | Gallop | 17—32 |
| 2,837,761 | 6/1958 | Stiegler | 249—74 |
| 2,896,528 | 7/1959 | Walters et al. | 17—32 X |
| 3,411,176 | 11/1968 | Holly | 17—32 |

LUCIE H. LAUDENSLAGER, Primary Examiner

U.S. Cl. X.R.

249—74